United States Patent
Walters et al.

(10) Patent No.: US 12,288,248 B2
(45) Date of Patent: *Apr. 29, 2025

(54) SYSTEM, METHOD, AND NON-TRANSITORY COMPUTER-READABLE MEDIA FOR OBTAINING USER PARAMETERS OF E-COMMERCE USERS TO AUTO COMPLETE CHECKOUT FORMS

(71) Applicant: Capital One Services, LLC, McLean, VA (US)

(72) Inventors: Austin Walters, Savoy, IL (US); Fardin Abdi Taghi Abad, Champaign, IL (US); Jeremy Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 32 days.

This patent is subject to a terminal disclaimer.

(21) Appl. No.: 18/190,945

(22) Filed: Mar. 27, 2023

(65) Prior Publication Data
US 2023/0237562 A1 Jul. 27, 2023

Related U.S. Application Data

(63) Continuation of application No. 17/378,833, filed on Jul. 19, 2021, now Pat. No. 11,657,445, which is a
(Continued)

(51) Int. Cl.
*G06Q 30/0601* (2023.01)
*G06F 40/174* (2020.01)
(Continued)

(52) U.S. Cl.
CPC ....... *G06Q 30/0641* (2013.01); *G06F 40/174* (2020.01); *G06N 20/00* (2019.01); *G06Q 30/0635* (2013.01); *H04L 67/535* (2022.05)

(58) Field of Classification Search
CPC .......... G06Q 30/0641; G06Q 30/0635; G06N 20/00; G06F 40/174; H04L 67/22
See application file for complete search history.

(56) References Cited

U.S. PATENT DOCUMENTS

2010/0191577 A1* 7/2010 Lu ................... H04L 67/51
707/E17.014
2016/0021503 A1* 1/2016 Tapia ................. H04W 24/02
455/456.1
(Continued)

OTHER PUBLICATIONS

T. Chusho, K. Fujiwara and K. Minamitani, "Automatic filling in a form by an agent for web applications," Ninth Asia-Pacific Software Engineering Conference, 2002., Gold Coast, QLD, Australia, 2002, pp. 239-247, doi: 10.1109/APSEC.2002.1182993. (Year: 2002).*

*Primary Examiner* — Matthew E Zimmerman
*Assistant Examiner* — Latasha D Ramphal
(74) *Attorney, Agent, or Firm* — Foley & Lardner LLP

(57) ABSTRACT

A system for obtaining user parameters of e-commerce users to auto complete checkout forms includes one or more processors configured to monitor user interactions of a user with a merchant website on a user device; determine an intent to purchase one or more items based of the monitoring; determine an unfilled template of a checkout form associated with the merchant website based on previously stored website information, wherein the unfilled template of the checkout form comprises a plurality of checkout form fields; determine one or more user parameters associated with the user device; apply a machine learning algorithm to predict a geolocation of the user device based on the one or more user parameters; and auto fill the at least one of the plurality of checkout form fields in the unfilled template of the checkout form based on the predicted geolocation.

20 Claims, 5 Drawing Sheets

Related U.S. Application Data continuation of application No. 16/591,744, filed on Oct. 3, 2019, now Pat. No. 11,127,073.

(51) Int. Cl.
  *G06N 20/00* (2019.01)
  *H04L 67/50* (2022.01)

(56) References Cited

U.S. PATENT DOCUMENTS

| | | | |
|---|---|---|---|
| 2017/0004469 A1* | 1/2017 | Cassel | H04L 63/08 |
| 2017/0177557 A1* | 6/2017 | Maltz | G06F 40/174 |
| 2019/0230070 A1* | 7/2019 | Isaacson | H04W 12/084 |
| 2020/0110795 A1* | 4/2020 | Gupta | G06F 40/30 |

* cited by examiner

SYSTEM, METHOD, AND NON-TRANSITORY COMPUTER-READABLE MEDIA FOR OBTAINING USER PARAMETERS OF E-COMMERCE USERS TO AUTO COMPLETE CHECKOUT FORMS

CROSS REFERENCE TO RELATED APPLICATIONS

This application is a continuation of U.S. patent application Ser. No. 17/378,833, filed Jul. 19, 2021, which is a continuation of U.S. patent application Ser. No. 16/591,744, filed on Oct. 13, 2019. The contents of which are hereby incorporated in its entirety by reference.

TECHNICAL FIELD

Embodiments of the present disclosure relate to systems and methods for obtaining user parameters of e-commerce users to auto complete checkout forms. More particularly, embodiments of the present disclosure relate to obtaining user parameters of e-commerce users to auto complete checkout forms based on utilizing a machine learning algorithm.

BACKGROUND

Users (e.g., online shopping customers) often utilize e-commerce websites (e.g., www.amazon.com, www.walmart.com or www.ebay.com) to purchase various items. By way of example, a user may spend time online browsing through an e-commerce website and, while browsing, the user may add multiple items to an e-shopping cart. Once the user has completed browsing, the user may close the e-commerce website and leave without purchasing the items that were added to the e-shopping cart. Users may leave the e-commerce website for various reasons including, for example, the users do not have time to follow a long and tedious process of manually filling out checkout forms by providing billing and personal information to complete their purchases, or because the users may not be sure of immediately purchasing the added items and would like to come back at a later time to complete their purchases. In such cases, the entire process of online shopping is inefficient as the process does not provide users with an optimized process of purchasing items, which results in a long time consuming and tedious tasks of buying items.

SUMMARY

In accordance with embodiments of the present disclosure, there is provided a system for obtaining user parameters of e-commerce users to auto complete checkout forms, the system comprising: one or more memory devices storing instructions; and one or more processors configured to execute the instructions to: monitor user interactions of a user with a merchant website on a user device; determine an intent to purchase one or more items based of the monitoring; determine an unfilled template of a checkout form associated with the merchant website based on previously stored website information, wherein the unfilled template of the checkout form comprises a plurality of checkout form fields; determine one or more user parameters associated with the user device; apply a machine learning algorithm to predict a geolocation of the user device based on the one or more user parameters; identify an autofill recommendation for at least one of the plurality of checkout form fields based on the geolocation and assign an accuracy score to the autofill recommendations; determine if the accuracy score associated with the autofill recommendation for the at least one of the plurality of checkout form fields exceeds a first threshold value and is below a second threshold value; generate and present in the user device, the autofill recommendation associated with the at least one of the plurality of checkout form fields, when the determination indicates that the accuracy score associated with the autofill recommendation associated with the at least one of the plurality of checkout form fields exceeds the first threshold value and is below the second threshold value; and auto fill the at least one of the plurality of checkout form fields in the unfilled template of the checkout form based on the input received.

In accordance with embodiments of the present disclosure, there is also provided a computer implemented method for obtaining user parameters of e-commerce users to auto complete checkout forms, the method comprising: monitoring user interactions of a user with a merchant website on a user device; determining an intent to purchase one or more items based of the monitoring; determining an unfilled template of a checkout form associated with the merchant website based on previously stored website information, wherein the unfilled template of the checkout form comprises a plurality of checkout form fields; determining one or more user parameters associated with the user device; applying a machine learning algorithm to predict a geolocation of the user device based on the one or more user parameters; identifying an autofill recommendation for at least one of the plurality of checkout form fields based on the geolocation and assigning an accuracy score to the autofill recommendations; determining if the accuracy score associated with the autofill recommendation for the at least one of the plurality of checkout form fields exceeds a first threshold value and is below a second threshold value; generating and presenting in the user device, the autofill recommendation associated with the at least one of the plurality of checkout form fields, when the determination indicates that the accuracy score associated with the autofill recommendation associated with the at least one of the plurality of checkout form fields exceeds the first threshold value and is below the second threshold value; and auto filling the at least one of the plurality of checkout form fields in the unfilled template of the checkout form based on the input received.

In accordance with embodiments of the present disclosure, there is further provided a non-transitory computer-readable medium storing instructions executable by one or more processors to perform operations for obtaining user parameters of e-commerce users to auto complete checkout forms, the operations comprising: monitoring user interactions of a user with a merchant website on a user device; determining an intent to purchase one or more items based of the monitoring; determining an unfilled template of a checkout form associated with the merchant website based on previously stored website information, wherein the unfilled template of the checkout form comprises a plurality of checkout form fields; determining one or more user parameters associated with the user device; applying a machine learning algorithm to predict a geolocation of the user device based on the one or more user parameters; identifying an autofill recommendation for at least one of the plurality of checkout form fields based on the geolocation and assigning accuracy score to the autofill recommendations; determining if the accuracy score associated with the autofill recommendation for the at least one of the plurality of checkout form fields exceeds a first threshold value and is below a second threshold value; generating and presenting in the user device, the autofill recommendation associated with the at least one of the plurality of checkout form fields, when the determination indicates that the accuracy score associated with the autofill recommendation associated with the at least one of the plurality of checkout form fields exceeds the first threshold value and is below the second threshold value; and auto filling the at least one of the plurality of checkout form fields in the unfilled template of the checkout form based on the input received.

BRIEF DESCRIPTION OF DRAWINGS

The accompanying drawings, which are incorporated in and constitute a part of his specification, illustrate disclosed embodiments and, together with the description, serve to explain the disclosed embodiments. In the drawings.

DETAILED DESCRIPTION

Figure 1:
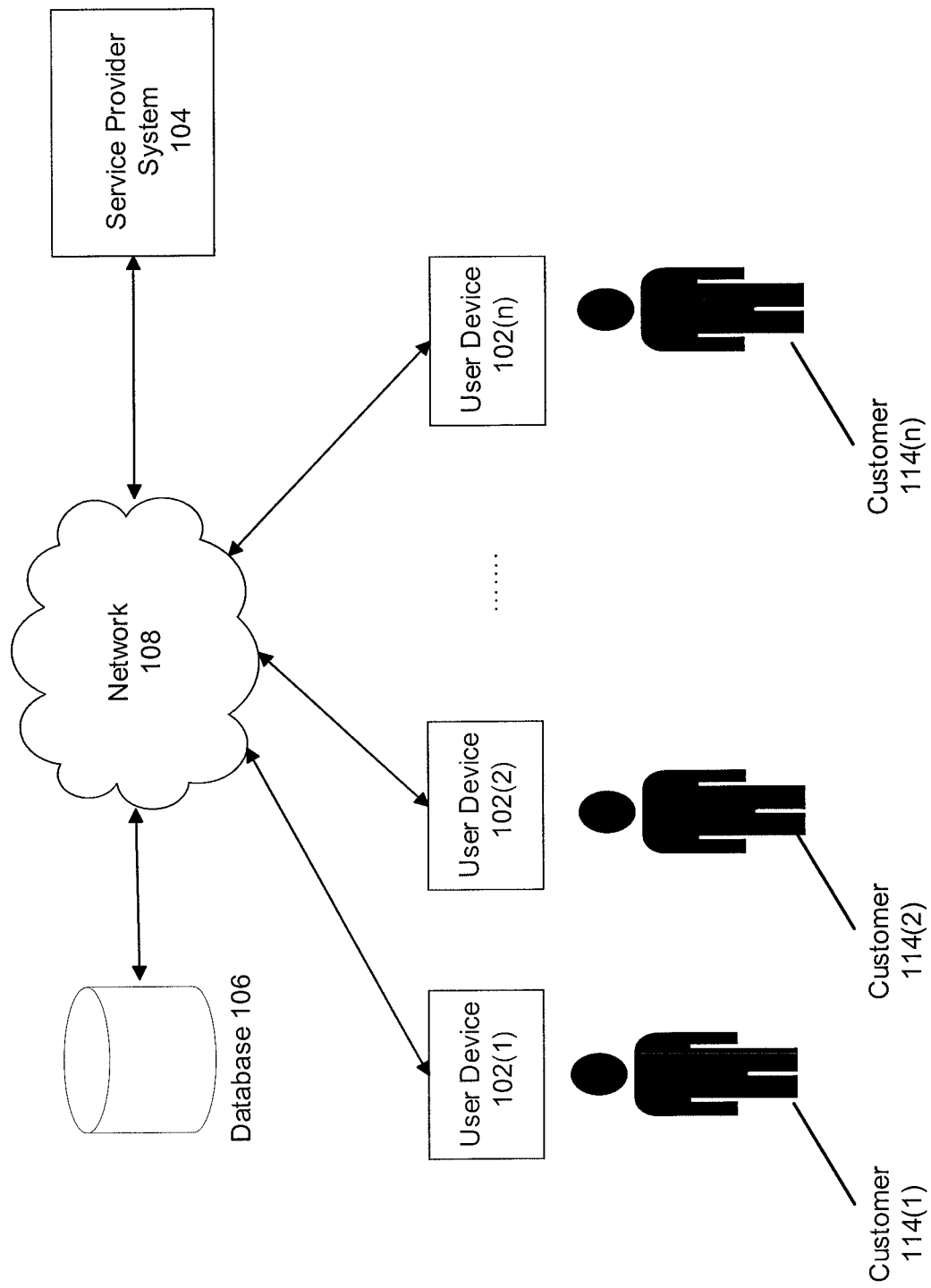
FIG. 1 is a block diagram of an exemplary system, consistent with disclosed embodiments.

Reference will now be made in detail to the disclosed embodiments, examples of which are illustrated in the accompanying drawings. Wherever convenient, the same reference numbers will be used throughout the drawings to refer to the same or like parts.

An initial overview of machine learning and prediction is first provided immediately below and then specific exemplary embodiments of systems, methods, and devices for obtaining user parameters of e-commerce users to auto complete checkout forms are described in further detail. The initial overview is intended to aid in understanding technology relevant to the systems, methods, and devices disclosed herein, but it is not intended to limit the scope of the claimed subject matter.

In the field of machine prediction, there are two subfields: knowledge-based systems and machine-learning systems. Knowledge-based systems rely on the creation of a heuristic or rule-based system which is then applied to a particular problem or dataset. Knowledge based systems make inferences or decisions based on an explicit "if-then" rule system. Such systems rely on extracting a high degree of knowledge about a limited category, with a goal of providing all possible solutions to a given problem. These solutions are then embodied in a series of instructions to be sequentially followed by a machine.

Machine learning systems, unlike knowledge-based systems, provide machines with the ability to learn through data input without being explicitly programmed with rules. For example, conventional knowledge-based system programming relies on writing algorithms (i.e., rules) and programming instructions to execute each algorithm. Machine learning systems, on the other hand, make data-driven decisions to construct their own rules. The nature of machine learning is the iterative process of using rules, and creating new ones, to identify unknown relationships to better generalize and handle non-linear problems with incomplete input data sets. A detailed explanation of one exemplary machine learning technique is disclosed in the article: Michalski, R. S., Stepp, R. E. "Learning from Observation: Conceptual Clustering," Chapter 11 of Machine Learning: An Artificial Intelligence Approach, eds. R. S. Michalski, J. G. Carbonell and T. M. Mitchell, San Mateo: Morgan Kaufmann, 1983 which is incorporated herein by reference. Embodiments of the present disclosure implement a prediction model which uses machine learning.

While the following description is directed to obtaining user parameters of e-commerce users to auto complete checkout forms based on utilizing a machine learning algorithm, it should be appreciated that the present disclosure is not limited to the specific disclosed embodiments and details, which are exemplary only. It is further understood that one possessing ordinary skill in the art, would appreciate the use of the embodiments of the present disclosure for their intended purposes and benefits in any number of alternative embodiments, depending on specific design and other needs.

FIG. 1 is a block diagram of an exemplary system 100, for performing one or more operations consistent with disclosed embodiments. In some embodiments, system 100 includes one or more user devices 102(1), 102(2), 102(n), one or more service provider systems 104, one or more databases 106, and a network 108. The components and arrangement of the components included in system 100 may vary. Thus, system 100 may include other components that perform or assist in the performance of one or more operations consistent with the disclosed embodiments.

As more fully described below, user devices 102(1)-102(n) and service provider system 104 may each include one or more computing devices (e.g., computer(s), server(s), etc.), memory storing data and/or software instructions (e.g., database(s), memory devices, etc.), and other known computing components. In some embodiments, the one or more computing devices may be configured to execute software instructions stored in the memory to perform one or more operations consistent with the disclosed embodiments. Aspects of service provider system(s) 104, database(s) 106, and user devices 102(1)-102(n) may be configured to communicate with one or more other components of system 100 via network 108, for example. In certain aspects, customers 114(1)-114(n) are respectively associated with and operate user devices 102(1)-102(n), to interact with one or more components of system 100 by sending and receiving communications, initiating operations, and/or providing input for one or more operations consistent with the disclosed embodiments. By way of example, customer 114(1) may be a first customer and customer 114(2) may be a second customer. Customers 114(1)-114(n) may have a financial banking account with the service provider system 104.

Service provider system 104 may be configured to access one or more user parameters associated with one or more of the user devices, e.g., user device 102(1). The one or more user parameters may include an IP address of user device 102(1), cookies stored on user device 102(1), and/or a fingerprint associated with user device 102(1), although any other information associated with user device 102(1) may also be included. The fingerprint associated with user device 102(1) may enable access to an operating system and/or hardware of user device 102(1), and/or types of applications stored on the user device 102(1), although any other information of the user device 102(1) may also be included. The types of applications stored on user device 102(1) may include a type of web browser, a uniform resource locator (URL) of a webpage accessed via the web browser, and a web browser version. Service provider system 104 may include a machine learning algorithm such as a Gaussian Process Regression (GPR) or a convolution long short-term memory (LSTM) network, however any other type of intelligence and machine learning algorithm may be applied. The machine learning algorithm analyzes the one or more user parameters to predict a geolocation of user device 102(1). Based on the predicted geolocation of user device 102(1), the machine learning algorithm provides a recommendation for a plurality form fields associated with a checkout form. The plurality of form fields of a checkout form may include: street address field, state field, zipcode field, country field, etc. In this example, the machine learning algorithm analyzes the IP address of user device 102(1) by performing a reverse lookup of the IP address of user device 102(1) to identify a device through which the IP address was routed. The device through which the IP address was routed includes a cell tower, a server, a router, etc. In this example, it is determined that the identified IP address was routed through a cell tower, by performing the reverse lookup of the IP address. The geolocation of the cell tower (e.g. street address of the cell tower, zipcode of the cell tower, state where the cell tower is located and/or country where the cell tower is located) is identified as the location of user device 102(1). In another example, the machine learning algorithm predicts a geolocation of user device 102(1) based on analyzing the cookies stored on user device 102(1) to determine that the cookies store geolocation information of user device 102(1). The geolocation provided by the cookies is identified as the location of user device 102(1). In another example, the machine learning algorithm predicts a geolocation of user device 102(1) based on analyzing the identified operating system, hardware, type of web browser, and/or web browser version of user device 102(1), to determine a geolocation of where a type of operating system is authorized to be utilized. By way of example, some operating systems may not be available outside a country (e.g., Korea, China, Russia, etc.). The geolocation determined of the operating system and/or hardware is identified as the geolocation of user device 102(1). In another example, the machine learning algorithm predicts a geolocation of user device 102(1) based on analyzing the identified uniform resource locator (URL) of a webpage accessed via the web browser to determine the type of language (e.g., French, German, Chinese, etc.) in which the web page is displayed. Based on the determined type of language, the machine learning algorithm determines the geolocation associated with that language (e.g., a country: Germany is associated with language German; China is associated with language Chinese) to the be geolocation of user device 102(1).

The machine learning algorithm provides recommendations for one or more of the plurality of form fields based on the identified geolocation of user device 102(1). By way of example, the plurality of form fields of a checkout form may provide recommendations for one or more of the street address field, state field, zipcode field, country field. Further, the machine learning algorithm assigns scores to the recommendations based on analyzing the geolocation of the user device determined based on the one or more user parameters.

A recommendation model, communicatively coupled to or included within service provider system 104, is constructed in advance using training data. The training data includes user parameters associated with a set of test user devices stored in database 106. System 100 may use one or more of a machine learning process to construct the recommendation model to predict geolocation and provide autofill recommendations for checkout form fields. System 100 may also have a machine learning algorithm incorporated such that the recommendation model may be updated based on inputs received from customer 114(1) associated with user device 102(1).

Database 106 of system 100 is communicatively coupled to service provider system 104 and user devices 102(1)-102(n) via network 108. Database 106 includes one or more memory devices that store information and are accessed and/or managed by one or more components of system 100. By way of example, database 110 may include Oracle™ databases, Sybase™ databases, or other relational databases or nonrelational databases, such as Hadoop sequence files, HBase, or Cassandra. Database 106 may include computing components (e.g., database management system, database server, etc.) configured to receive and process requests for data stored in memory devices of database 106 and to provide data from database 106. Database 106 is configured to store one or more of the above-described user parameters.

Service provider system 104 may be associated with a financial service entity that provides, maintains, manages, or otherwise offers financial services. For example, the financial service entity may be a bank, credit card issuer, or any other type of financial service entity that generates, provides, manages, and/or maintains financial service accounts for one or more users. Financial service accounts may include, for example, credit card accounts, loan accounts, checking accounts, savings accounts, reward or loyalty program accounts, and/or any other type of financial service account known to those skilled in the art. In providing, maintaining, managing, or otherwise offering financial services, service provider system 104 may be enabled to authenticate financial transactions associated with financial service accounts of customers 114(1)-114(n).

In one aspect, service provider system 104 may include one or more computing devices, configured to perform one or more operations consistent with disclosed embodiments as described more fully below in relation to FIG. 3. In one aspect, service provider system 104 may include one or more servers or server systems. Service provider system 104 may include one or more processors configured to execute software instructions stored in a memory or other storage device. The one or more processors may be configured to execute the stored software instructions to perform internet-related communication, financial service-based processes, and machine learning for predicting geolocations of customers 114(1)-114(n) and providing autofill recommendations for a plurality of form fields in a checkout form. The one or more computing devices of service provider system 104 may also be configured to communicate with other components of system 100 to predict geolocation of customers 114(1)-114(n) and provide autofill recommendations for a plurality of form fields in a checkout form. In some embodiments, service provider system 104 may provide one or more mobile banking applications, web-sites, or online portals that are accessible by user devices 102(1)-102(n) over network 108. The disclosed embodiments are not limited to any particular configuration of service provider system 104.

Service provider system 104 and user devices 102(1)-102(n) are configured to communicate with each other over network 108. Network 108 may comprise any type of computer networking arrangement configured to provide communications or exchange data, or both, between components of system 100. For example, network 108 may include any type of network (including infrastructure) that provides communications, exchanges information, and/or facilitates the exchange of information, such as the Internet, a private data network, a virtual private network using a public network, a LAN or WAN network, a Wi-Fi™ network, and/or other suitable connections that may enable information exchange among various components of system 100. Network 108 may also include a public switched telephone network ("PSTN") and/or a wireless cellular network. Network 108 may be a secured network or unsecured network. In some embodiments, one or more components of system 100 may communicate directly through a dedicated communication link(s).

User devices 102(1)-102(n) may be one or more computing devices configured to perform one or more operations consistent with the disclosed embodiments, as described more fully below in relation to FIG. 2. User devices 102(1)-102(n) may execute browser or related mobile display software that displays ranked customer account profiles and interfaces for financial transactions, on a display included in, or connected to, user devices 102(1)-102(n). User devices 102(1)-102(n) may also store and execute other mobile applications that allow customers 114(1)-114(n) to select a method by which customers 114(1)-114(n) wish to receive notifications from service provider system 104.

It is to be understood that the configuration of the functional blocks of system 100 has been defined herein for convenience of description. The components and arrangement of the components included in system 100 may vary. For example, in some embodiments, system 100 may include other components that perform or assist in the performance of one or more processes consistent with disclosed methods. System 100 includes a number of components generally described as computing devices. Each of the computing devices may include any number of computing components particularly configured as a special purpose computing device to perform the functionality disclosed herein. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
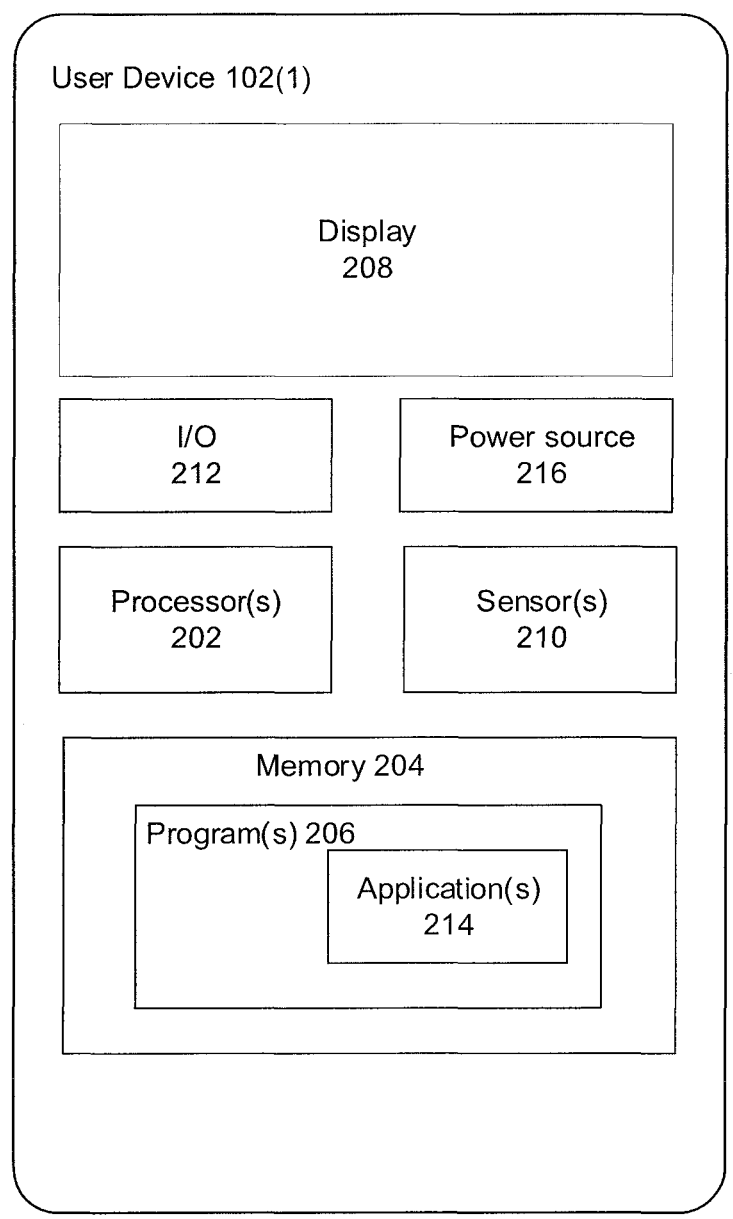
FIG. 2 is a block diagram of an exemplary user device, consistent with disclosed embodiments.

FIG. 2 is a block diagram of an exemplary user device 102(1), consistent with disclosed embodiments. User devices 102(2)-102(n) may be similarly configured. User device 102(1) may enable associated customer 114(1) to perform remote interactions or mobile transactions with service provider system 104, for example, or receive information from service provider system 104. In some embodiments, user device 102(1) may be a personal computing device. For example, user device 102(1) may be a smartphone, a laptop or notebook computer, a tablet, a multifunctional watch, a pair of multifunctional glasses, or any mobile or wearable device with computing ability, or any combination of these computers and/or affiliated components.

User device 102(1) includes one or more processors 202 configured to execute software instructions stored in memory, such as a memory 204. Memory 204 may store one or more software programs 206 that when executed by processor 202 perform known Internet-related communication, content display processes, and other interactive processes for customer 114(1). For instance, user device 102(1) may execute a browser or related mobile display software that generates and displays interfaces including content on a display device 208 included in, or in communication with, user device 102(1). User device 102(1) may be a mobile device that executes mobile device applications and/or mobile device communication software, included in and other components via network 108, to generate and display content in interfaces via display device 208. The disclosed embodiments are not limited to any particular configuration of user device 102(1). User device 102(1) may include any arrangement of one or more computing devices configured to perform one or more operations consistent with disclosed embodiments.

User device 102(1) may be configured to store, in memory 204, one or more operating systems that perform known operating system functions when executed by processor 202. By way of example, the operating systems may include Microsoft Windows™, Unix™, Linux™ Android™, Apple™ Mac OS operating systems, iOS, Chrome OS, or other types of operating systems. Accordingly, disclosed embodiments may operate and function with computer systems running any type of operating system. User device 102(1) may also include communication software stored in memory 204 that, when executed by processor 202, provides communications via network 108, such as Web browser software, tablet or smart handheld device networking software, etc.

Display device 208 may include, for example, a liquid crystal display (LCD), a light emitting diode screen (LED), an organic light emitting diode screen (OLEO), a touch screen, and other known display device. Display device 208 may display various information to customer 114(1). For example, display device 208 may display an interactive interface to customer 114(1) enabling customer 114(1) to operate user devices 102(1) to perform certain aspects of the disclosed methods. Display device 208 may display touchable or selectable options for customer 114(1) to select and may receive customer selection of options through a touch screen.

User device 102(1) includes I/O devices 212 that allow user device 102(1) to send and receive information or interact with customer 114(1) or another device. For example, I/O devices 212 may include various input/output devices, such as a keyboard, a mouse-type device, a gesture sensor, an action sensor, a physical button, switch, microphone, touchscreen panel, stylus, etc., that may be manipulated by customer 114(1) to input information using user devices 102(1). I/O devices 212 may also include an audio output device, such as a speaker configured to provide sound and audio feedback to customer 114(1) operating user device 102(1). In some embodiments, I/O devices 212 may include a light emitting component, such as an LED or other component capable of providing a visible signal to customer 114(1). I/O devices 212 may also include haptic output devices, to provide haptic feedback to customer 114(1). I/O devices 212 may also include one or more communication modules (not shown) for sending and receiving information from other components in system 100 by, for example, establishing wired or wireless connectivity between user device 102(1) and network 108. 1/0 devices 212 may include radio frequency, infrared, or other near-field communication interfaces, for communicating with other devices associated with network 108 or customer 114(1). Exemplary communication modules of I/O devices 212 may include, for example, a short-range or near field wireless communication modem, a Wi-Fi™ communication modem, or a cellular communication modem. I/O devices 212 may include a transceiver or transmitter configured to communicate using one or more wireless technologies/protocols that may include, without limitation, cellular (e.g., 3G, 4G, etc.) technology, Wi-Fi™ hotspot technology, RFID, near-field communication (NFC) or BLUETOOTH® technologies, etc. More generally, any uni- or bi-directional communication technology known to one of ordinary skill in the art may be implemented in user device 102(1) to exchange information with service provider system 104 or database 106 via network 108.

As described above, user devices 102(1) may be a device that executes mobile applications for performing operations consistent with disclosed embodiments. Thus, in some embodiments, programs 206 stored on user devices 102(1) may include one or more software applications 214 installed thereon, that enable user device 102(1 to communicate with service provider system 104 via network 108 and perform aspects of the disclosed methods. For example, user device 102(1) may connect to service provider system 104 by using browser software to access and receive information or perform other operations associated with an internet service provider.

According to an exemplary embodiment, software applications 214 associated with service provider system 104 may be installed on user device 102(1), as shown in FIG. 2. For example, service provider system 104 may receive a request from user device 102(1) to download one or more software applications 214 to user device 102(1). In one embodiment, service provider system 104 may receive the request from customer 114(1), using a web browser application installed on user device 102(1). In another embodiment, service provider system 104 may receive the request to download one or more software applications 214 associated with service provider system 104 onto user device 102(1) from a webpage or another portal associated with service provider system 104 accessed by customer 114(1) via, e.g., user device 102(1). In this embodiment, service provider system 104 may store software instructions corresponding to one or more software applications 214 in database 106. For responding to the download request, service provider system 104 may receive additional information from user device 102(1) regarding the particular device specifications of user device 102(1) to enable user device 102(1) to download software instructions corresponding to the particular specifications. Alternatively, service provider system 104 may push a download request link to user device 102(1) or transmit software code corresponding to one or more software applications 214 directly to user device 102(1) in, for example, an e-mail, a text or short message service (SMS) message, a prompt through an app, or other suitable method. User device 102(1) may receive the software code related to one or more software applications 214, such as via network 108, to download and install the software code.

Figure 3:
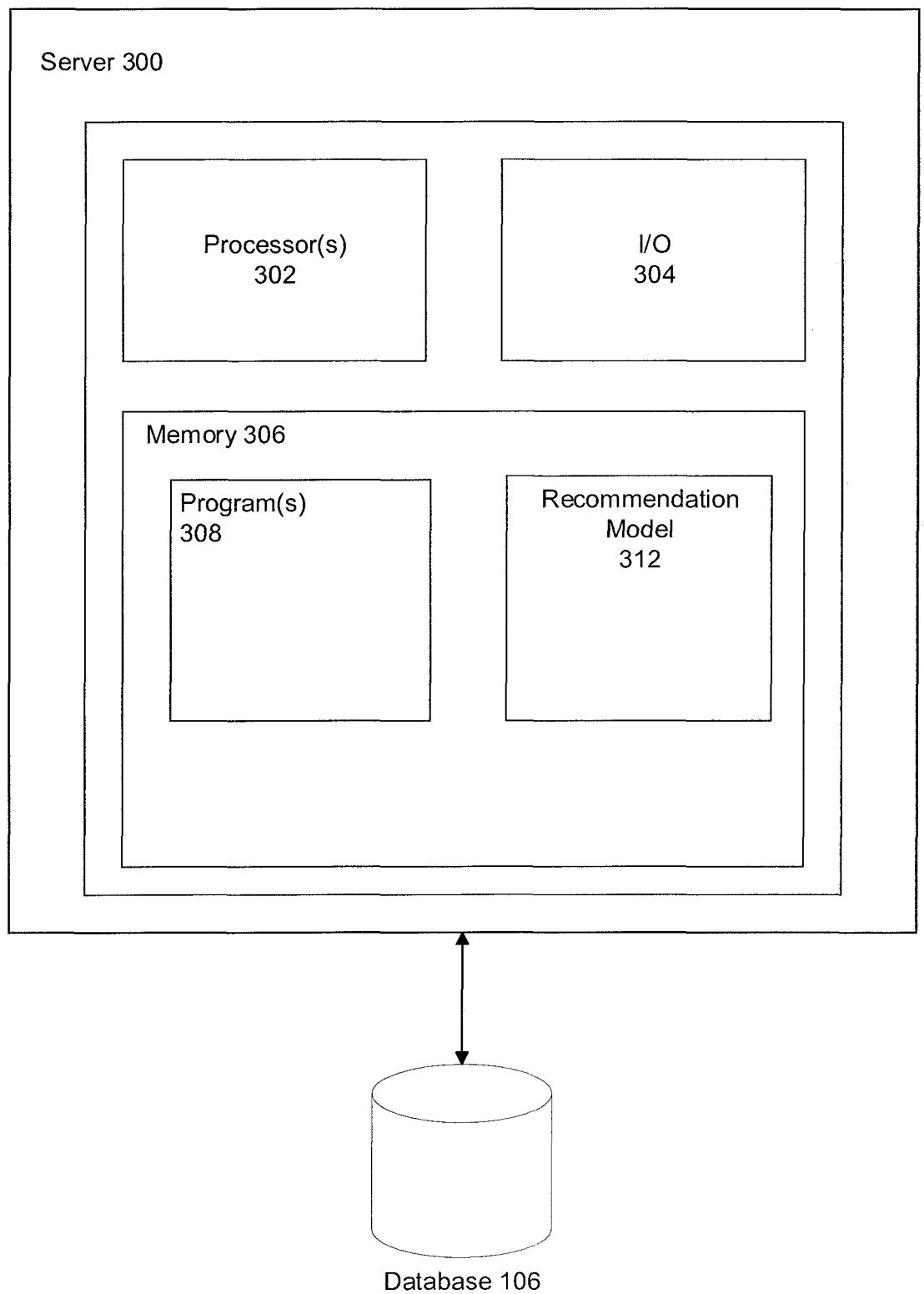
FIG. 3 is a block diagram of an exemplary server, consistent with disclosed embodiments.

FIG. 3 is a block diagram of an exemplary server 300 consistent with the disclosed embodiments. Variations of exemplary server 300 may constitute one or more components of service provider system 104. In one embodiment, server 300 includes one or more processors 302, one or more input/output (I/O) devices 304, and one or more memories 306. In some embodiments, server 300 may be a part of service provider system 104. In some embodiments, server 300 may take the form of a specially programmed server or computing system used by service provider system 104. In some embodiments, server 300 may be configured as an apparatus, embedded system, dedicated circuit, or the like based on the storage, execution, and/or implementation of software instructions that perform one or more operations consistent with the disclosed embodiments.

Processor 302 may include one or more known processing devices, such as a microprocessor from the Pentium™ or Xeon™ family manufactured by Intel™, or the Turion™ family manufactured by AMO™, for example. The disclosed embodiments are not limited to any type of processor(s) otherwise configured to meet the computing demands required of different components of system 100.

Input/output (I/O) devices 304 may include various input/output devices, such as a keyboard, a mouse-type device, a gesture sensor, an action sensor, a physical button, switch, microphone, touchscreen panel, stylus, etc. I/O devices 304 may also include an audio output device. Exemplary communication modules of I/O devices 304 may include, for example, a short-range or near field wireless communication modem, a Wi-Fi™ communication modem, or a cellular communication modem. I/O devices 304 may include a transceiver or transmitter configured to communicate using one or more wireless technologies/protocols that may include, without limitation, cellular (e.g., 3G, 4G, etc.) technology, Wi-Fi™ hotspot technology, RFID, near-field communication (NFC) or BLUETOOTH® technologies, etc. More generally, any uni- or bi-directional communication technology known to one of ordinary skill in the art may be implemented in Server 300 to exchange information with service provider system 104, user devices 102(1)-102(n), or database 106 via network 108.

Memory 306 may include one or more storage devices configured to store instructions used by processor 302 to perform functions related to disclosed embodiments. For example, memory 306 may be configured with one or more software instructions, such as program(s) 308 that may perform one or more operations when executed by processor 302. The disclosed embodiments are not limited to separate programs or computers configured to perform dedicated tasks. For example, memory 306 may include a single program 308 that performs the functions of server 300, or program 308 may comprise multiple programs. In certain embodiments, memory 306 may store sets of instructions or programs 308 for receiving and storing a list of form fields of a checkout form associated with a plurality of websites, monitoring user interactions with the plurality of websites, predicting geolocation of customers 114(1)-114(n) based on analyzing user parameters associated with customers 114(1)-114(n). These sets of instructions may be executed by processor 302 to perform communication and/or processes consistent with disclosed embodiments.

In certain embodiments, when server 300 constitutes one or more of the components of service provider system 104, memory 306 includes a recommendation model 312, corresponding to the above-described recommendation model, which uses a machine learning algorithm to identify and predict geolocations of the customers 114(1)-114(n), as described in detail below. Recommendation model 312 may employ various machine learning algorithms including decision tree learning, association rule learning, artificial neural networks, inductive logic programming, support vector machines, clustering, Bayesian networking, reinforcement learning, representation learning, similarity and metric learning, spare dictionary learning, rule-based machine learning, etc. Recommendation model 312 may iteratively update its algorithm each time customers 114(1)-114(n) make a financial transaction, to increase its recommendation accuracy.

Figure 4A:
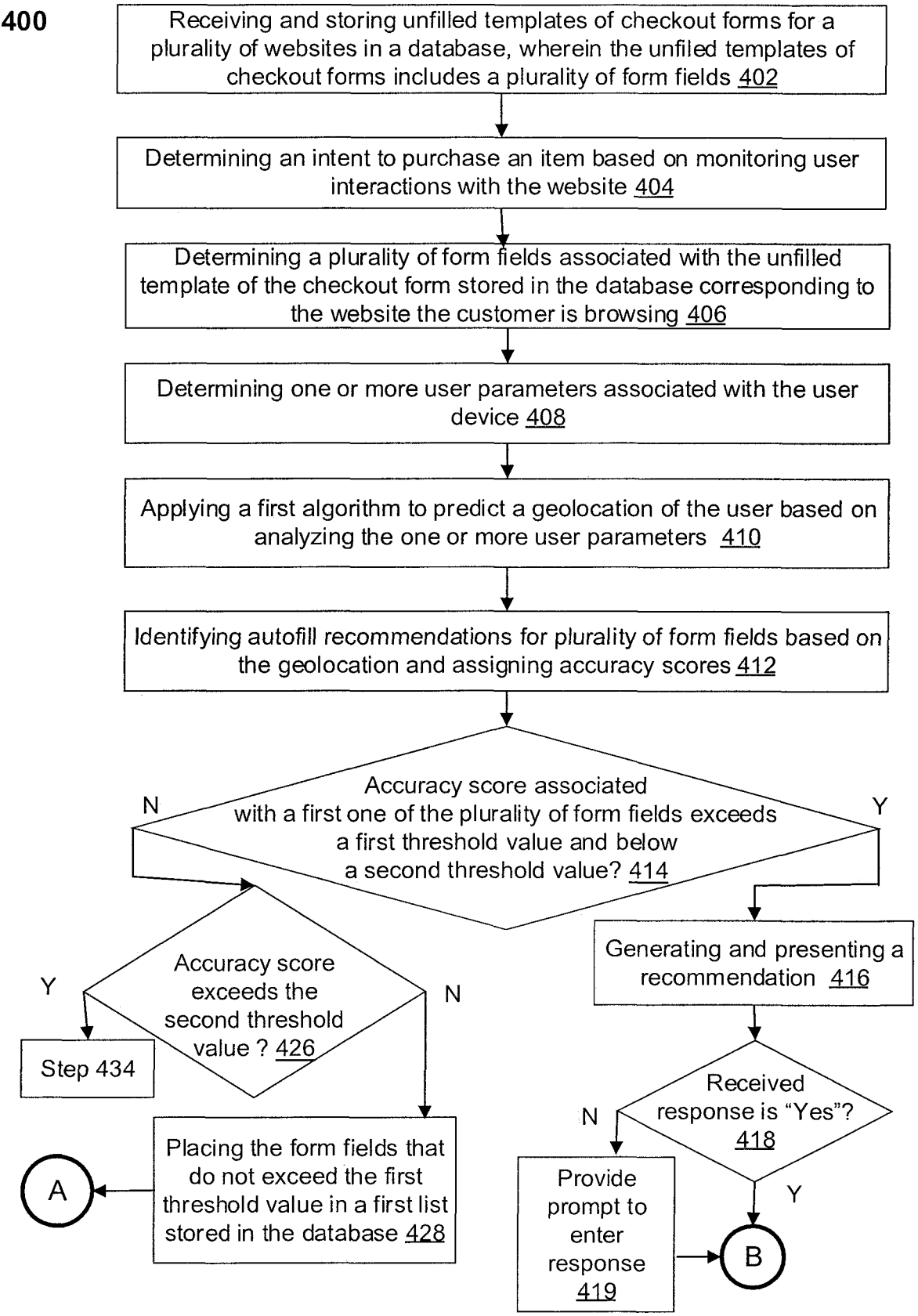
FIGS. 4A-4B contain a flowchart of an exemplary process of obtaining user parameters of e-commerce users to auto complete checkout forms, consistent with disclosed embodiments.
Figure 4B:
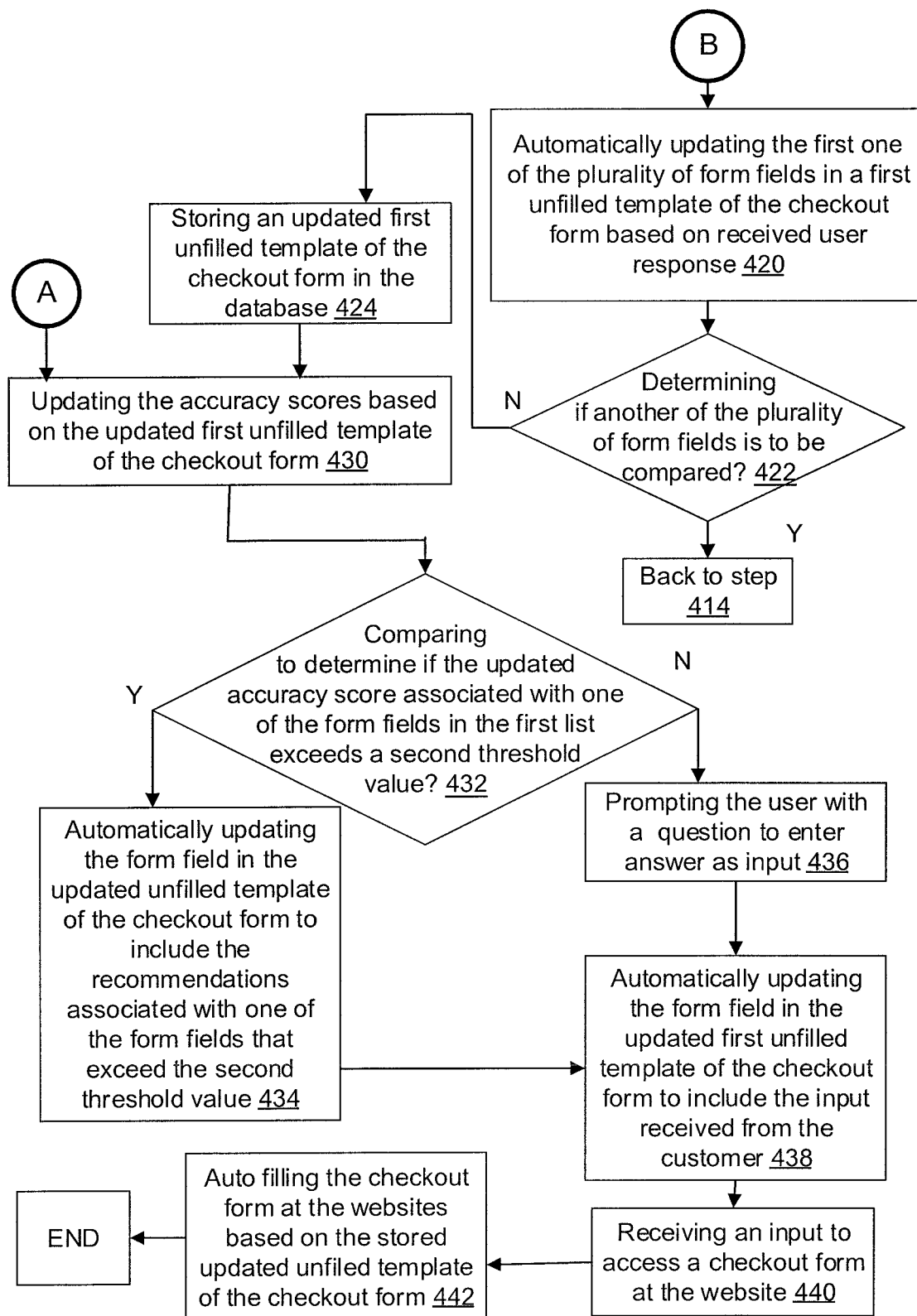

FIGS. 4A and 4B contain a flowchart of an exemplary process 400 for obtaining user parameters of e-commerce users in order to auto complete checkout forms, consistent with the disclosed embodiments. In certain aspects, service provider system 104 utilizes server 300 to execute software instructions that perform one or more of the operations of process 400. Also, server 300 may perform all of the functions of service provider system 104.

Service provider system 104 in step 402 of FIG. 4A receives and stores in database 106 a plurality of unfilled templates of checkout forms for a plurality of websites received from a system administrator (not shown in the drawings). The unfilled templates of the checkout forms are previously stored with their corresponding website identifiers as part of stored website information. The website identifier of each stored website may include a uniform resource locator (URL) of the website The unfilled templates of checkout forms include a plurality of form fields and the plurality of websites may include e-commerce websites (e.g., www.amazon.com, www.walmart.com or www.ebay.com,etc.). The plurality of form fields may include, street address, apt, suite, phone number, city, email address, state, zipcode, first name, last name, although any other type of form field associated with a checkout form may also be included.

Service provider system 104 in step 404 monitors user interactions with one or more of software applications installed on user device 102(1). The user interactions may include any interaction of customer 114(1) with the one or more software applications installed on user device 102(1). The service provider system 104 determines customer 114(1) associated with user device 102(1) intends to purchase an item based on monitoring the user interactions. Service provider system 104 determines that customer 114(1) intends to purchase an item, when service provider system 104 determines that customer 114(1) performs user interactions such as web browsing an e-commerce website via a web browser software application installed on the user device, adds items in an online shopping cart of the e-commerce website, clicks on a checkout button of the e-commerce website, opens of a mobile application installed on user device 102(1), or clicks on an item in the e-commerce website, although any other user interaction with a software application may also be included.

Service provider system 104 in step 406 identifies an unfilled template of checkout form associated with the website with which the user interacts by accessing the plurality of unfilled templates of checkout forms stored in database 106. Service provider system 104 identifies a website identifier associated with the real time website where customer 114(1) intends to purchase an item. The website identifier of the real time website may include a uniform resource locator (URL) of the website. Service provider system 104 accesses the database 106 to match the identified website identifier of the real time website customer 114(1) is browsing with the website identifier corresponding to stored websites associated with the unfilled templates stored in database 106. Service provider system 104 identifies the unfilled template of the checkout form associated with the website identifier associated with the stored website that matches the website identifier associated with the real time website where customer 114(1) intends to purchase items. Service provider system 104 determines a plurality of form fields associated with the identified unfilled template of the checkout form stored in the database corresponding to the website where the customer is browsing and intends to purchase items.

Service provider system 104 in step 408 determines one or more user parameters associated with user device 102(1). As explained above, one or more user parameters may include an IP address of user device 102(1), cookies stored on user device 102(1), and/or a fingerprint associated with user device 102(1), although any other information associated with user device 102(1) may also be included. The fingerprint associated with user device 102(1) may include an operating system and/or hardware of user device 102(1), types of applications stored on user device 102(1), although any other information of user device 102(1) may also be included. The types of applications stored on user device 102(1) may include a type of web browser, a uniform resource locator (URL) of a webpage accessed via the web browser, and a web browser version.

Service provider system 104 in step 410 applies a first algorithm to predict a geolocation of the user based on analyzing the determined one or more user parameters. The first algorithm, in this example, is the machine learning algorithm, described above. The machine learning algorithm analyzes the one or more user parameters to predict a geolocation of user device 102(1). In step 412, based on the predicted geolocation of user device 102(1), the machine learning algorithm provides recommendations for a plurality form fields associated with a checkout form. The plurality of form fields of the identified unfilled template of the checkout form may include: street address field, state field, zipcode field, country field. In this example, the machine learning algorithm, based on the analysis of the IP address of user device 102(1), predicts the geolocation of user device 102(1) to be Germany and, based on the analysis of the cookies stored on user device 102(1), also predicts the geolocation of user device 102(1) to be Germany. In addition, based on analysis of the fingerprint associated with user device 102(1), predicts the geolocation to be Germany.

In this example, the machine learning algorithm, based on the analysis of the IP address of user device 102(1), predicts the geolocation of user device 102(1) to be "Friedrich-Ebert-Damm 12345, 20123 Hamburg, Germany". Further, based on analysis of the fingerprint associated with user device 102(1) predicts the geolocation to be in zipcode of 20123.

Service provider system 104 in step 412 identifies and scores autofill recommendations for the plurality of form fields determined in step 406 based on the geolocation predicted in step 410. The machine learning algorithm in step 412 provides recommendations for one or more of the pluralities of form fields based on the identified geolocation of user device 102(1). In this example, the plurality of form fields of a checkout form includes: street address .field, state field, zipcode field and country field. Further, based on the prediction of the geolocation made in step 410, the machine learning algorithm provides autofill recommendations for the form fields of street address field, state field, zipcode field and country field based on the predicted geolocation.

By way of example, the machine learning algorithm identifies autofill recommendations of the street address field to be "Friedrich-Ebert-Damm 12345", the state field to be "Hamburg", the zipcode to be "20123", and the country field to be "Germany". Further, the machine learning algorithm has been previously trained to assign accuracy scores to the identified autofill recommendations. Thus, the machine learning algorithm assigns an accuracy score of 55% to the street address field of "Friedrich-Ebert-Damm 12345", assigns an accuracy score of 55% to the zipcode field of "20123", assigns an accuracy score of 45% to the state field of "Hamburg", and assigns an accuracy score of 82% to the country field of "Germany".

Service provider system 104 in step 414 determines if the condition of the accuracy score associated with each of the plurality of form fields exceeds a first threshold value and is below a second threshold value. By way of example, the first threshold value is 50% and the second threshold value is 80%. In this example, the machine learning algorithm compares each of the plurality of form fields one after the other. The machine learning algorithm compares a first one of the plurality of form fields. In this example, the first one of the plurality of form fields is the address field. When the machine learning algorithm compares the address field with the accuracy score of 55% to determine that it exceeds the first threshold value of 50% and is below the second threshold value of 80%, which satisfies the condition of step 414, the method takes the Yes branch to step 416.

Service provider system 104 in step 416 generates and presents a recommendation to the user while the user is browsing the e-commerce website and before the user reaches the checkout form webpage. The recommendation would be in the form of a pop window on the top of the webpage. The recommendation would correspond to the first one of the plurality of form fields i.e. the address field of "Friedrich-Ebert-Damm 12345". The prompt presents a question with multiple choices answer for customer 114(1) to select and provide as input. The prompt may be "Do you want this item to be delivered to Friedrich-Ebert-Damm 12345?", or "Is Friedrich-Ebert-Damm 12345 your shipping street address?", followed by multiple choices of "Yes" and "No". Customer 114(1) can provide their input by selecting either Yes or No as an answer.

Service provider system 104 in step 418 determines if the received selection by customer 114(1) is a "Yes" answer When, service provider system 104 in step 418 determines that the received selection is a "No" as an answer, then in step 419 in response to the recommendation provided in the prompt, service provider system 104 provides another prompt asking the user to provide an input e.g. "Please enter the street address where you would like this item to be delivered at", or "Please enter your shipping street address?". Upon receiving the input to the prompt, service provider system 104 proceeds to step 420. In step 420 service provider system 104 automatically updates the first one of the plurality of form fields in the first unfilled template of the checkout form. In this example, the address field in the first unfilled template of the checkout form is updated to include the address inputted by customer 114(1).

In this example, service provider system 104 in step 420 receives a selection of "Yes" as an answer in step 418 in response to the recommendation provided in the prompt. Accordingly, service provider system 104 automatically updates the first one of the plurality of form fields in the first unfilled template of the checkout form. In this example, the address field in the first unfilled template of the checkout form is updated to include the address of "Friedrich-Ebert-Damm 12345".

Service provider system 104 in step 422 determines if another one of the plurality of form fields is to be compared to determine if the accuracy score associated with the another one of the plurality of form fields exceeds the first threshold value and is below the second threshold value. When the service provider system 104 in step 422 determines that another one of the plurality of form fields is to be compared, then the method takes the Yes branch and loops back step 414. In this example, service provider system 104 then performs the comparison for the zipcode field that has an accuracy of 55%, the state field that has an accuracy of 45%, and the country field that has an accuracy of 82%.

In step 414, for the zipcode field of "20123" with an accuracy value of 55%, the accuracy score exceeds the first threshold value of 50% and does not exceed the second threshold value of 80%, so service provider system 104 takes the Yes branch to step 416. Steps 416-424 are performed substantially similarly for the zipcode field as explained above with respect to the street address field. In this example, at step 418, customer 114(1) provides a response of Yes. In step 420, service provider system 104 automatically updates the zipcode field of the unfilled template of the checkout form to include "20123" as the zipcode.

In step 414, for the state field of "Hamburg" with an accuracy value of 45%, the accuracy score does not exceed the first threshold value of 50%, so service provider system 104 takes the No branch to step 426. In step 426, the service provider system 104 determines if the accuracy score exceeds the second threshold value of 80%. In this example, as the accuracy score of 45% does not exceed the second threshold value, process 400 takes the No branch to step 428. in step 428, service provider system 104 places the state form field of "Hamburg" in a first list stored in database 106.

In step 414, for the country field of "Germany" with an accuracy value of 82%, the accuracy score does exceed the first threshold value of 50% but is not below the second threshold value of 80%, so service provider system 104 takes the No branch to step 426. In step 426, the service provider system 104 determines if the accuracy score exceeds the second threshold value of 80%. In this example, the accuracy score of 82% does exceed the second threshold value, and process 400 takes the Yes branch to step 434. Step 434 is explained in detail below.

In step 422, when the service provider system 104 determines that another one of the plurality of form fields is not to be compared and all of the plurality of form fields have been compared, then process 400 takes the No branch and proceeds step 424.

Service provider system 104 in step 424 stores an updated version of the first unfilled template of the checkout form in database 106. In this example, the updated version of the first unfilled template of the checkout form includes the street address field of "Friedrich-Ebert-Damm 12345" and the zipcode form field of "20123", as explained in step 420 above.

Service provider system 104 in step 430, applies the machine learning algorithm to update the accuracy scores based on the updated first unfilled template of the checkout form. In step 430, the machine learning algorithm identifies the first unfilled template of the checkout form to include the street address field of "Friedrich-Ebert-Damm 12345" and the zipcode form field of "20123", and further determines that the street address and zipcode correspond to the state of Hamburg in Germany. As the machine learning algorithm now determines the state field to be "Hamburg", based on this determination, the machine learning algorithm updates the accuracy score associated with the state field stored in the first list from 45% to 100% and the process 400 proceeds to step 432.

Service provider system 104 in step 432 performs a comparison to determine if the updated accuracy score associated with the one of the form fields in the first list exceeds a second threshold value of 80%. In this example, as the accuracy value associated with the state field in the first list is 100%, service provider system 104 determines that the accuracy value of the state field exceeds the second threshold value of 80% takes the Yes branch to step 434.

Service provider system 104 in step 434 automatically updates the form field in the updated unfilled template of the checkout form to include the recommendations associated with the one of the form fields that exceeds the second threshold value. In this example, the service provider system 104 updates the state field of the unfilled template of the checkout form to include "Hamburg". When the method reaches step 434 from step 426, then the service provider system 104 automatically updates the form field of the updated unfilled template of the checkout form. In this example, when the method reached step 432 from step 426, the service provider system 104 updates the country field to include "Germany".

In step 432, when the service provider 104 determines that the updated accuracy score associated with the one of the form fields in the first list does not exceed a second threshold value of 80%, then the method takes the No branch to step 436.

In step 436, service provider system 104 provides a prompt asking user 114(1) to provide an input, e.g., "Please enter the street address where you would like this item to be delivered", "Please enter your shipping country" or "Please enter your zipcode".

In another example, service provider system 104 provides a prompt asking user 114(1) to select from multiple choices an answer to be provide as an input, e.g., "Please select your shipping country" with corresponding to multiple choices answers of "Germany", "USA", and "Austria". The user 114(1) may then select one of the answers to provide as input to provide their country information in a causal experience.

In step 438, service provider system 104, upon receiving the input to the prompt from customer 114(1), automatically updates the first updated unfilled template of the checkout form. The first updated unfilled template of the checkout form was stored in the database 106 in earlier step 424.

In step 440, the service provider system 104 monitors the user interactions and receives an input to access a checkout form at the e-commerce website. When the user selects a checkout icon on the e-commerce website, process 400 moves to next step 442.

In step 442, service provider system 104 receives an empty checkout form from the e-commerce website. Service provider system 104 auto fills the form fields of the empty checkout form of the e-commerce website to include the data from the form fields that are filled in the stored updated unfilled template of the checkout form and displays it on the web browser. The displayed webpage includes an auto-filled checkout form generated based on the stored updated unfilled template of the checkout form.

The disclosed embodiments provide an improved method of obtaining user parameters of e-commerce users to auto complete checkout forms based on utilizing a machine learning algorithm. By predicting a geolocation of user device 102(1), service provider system 104 may provide recommendations to complete a checkout associated with an e-commerce website where customer 114(1) is shopping. The disclosed embodiments provide improved online shopping interfaces that gives the customer 114(1) a seamless method of purchasing items online by taking into consideration their geolocation. Further, the disclosed embodiments provide the advantages of an optimized user experience with minimal input from the customer to fill checkout forms to complete their purchases.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The elements in the claims are to be interpreted broadly based on the language employed in the claims and not limited to examples described in the present specification or during the prosecution of the application, which examples are to be construed as non-exclusive. It is intended, therefore, that the specification and examples be considered as exemplary only, with a true scope and spirit being indicated by the following claims and their full scope of equivalents.

What is claimed is:

1. A system for auto completing electronic forms, the system comprising:
    one or more memory devices storing instructions; and
    one or more processors configured to execute the instructions to:
        identify, based on previously stored form information, an unfilled electronic form accessed by a user device, wherein the unfilled electronic form comprises a plurality of electronic form fields;
        predict, using a machine learning algorithm, a geolocation of the user device based on one or more user parameters associated with the user device, wherein the machine learning algorithm is trained using training data comprising user parameters associated with a set of test user devices;
        predict, using the machine learning algorithm, (i) a first autofill recommendation for a first electronic form field of the plurality of electronic form fields of the unfilled electronic form based on the geolocation and (ii) a first accuracy score associated with the first autofill recommendation;
        in response to determining that the first accuracy score associated with the first autofill recommendation exceeds a first threshold value and is less than a second threshold value, provide a prompt comprising the first autofill recommendation for the first electronic form field to the user device;
        receive an input to the prompt comprising an update to the first autofill recommendation for the first electronic form field;
        using the machine learning algorithm, determine (1) a second autofill recommendation for a second electronic form field of the plurality of electronic form fields of the unfilled electronic form based on the update to the first autofill recommendation and (2) assign a second accuracy score to the second autofill recommendation; and
        store the update to the first autofill recommendation and the second autofill recommendation as updated autofill recommendations for the first electronic form field and the second electronic form field of the plurality of electronic form fields of the unfilled electronic form.

2. The system of claim 1, wherein the one or more processors are further configured to:
    determine an intent to purchase one or more items by monitoring user interactions of a user with a website accessed via the user device, wherein the unfilled electronic form is associated with the website.

3. The system of claim 2, wherein the intent to purchase the one or more items includes adding the one or more items to a shopping cart of the website.

4. The system of claim 1, wherein the one or more processors are further configured to:
    in response to determining that the first accuracy score and the second accuracy score exceed the first threshold value, including in a first list stored in a database, the first electronic form field and the second electronic form field.

5. The system of claim 4, wherein the one or more processors are further configured to store the unfilled electronic form including the first autofill recommendation for the first electronic form field and the second autofill recommendation for the second electronic form field in the database.

6. The system of claim 1, wherein the instructions for determining the geolocation of the user device further cause the one or more processors to:
  determine an Internet Protocol address of the user device; and
  identify, based on the Internet Protocol address of the user device, a routing device through which interactions were routed by performing a reverse lookup of the Internet Protocol address of the user device.

7. The system of claim 1, wherein the second accuracy score replaces a prior accuracy score associated with the second electronic form field, the second accuracy score being greater than the prior accuracy score.

8. The system of claim 1, wherein the one or more processors are further programmed to:
  responsive to determining that the first accuracy score is greater than the first threshold value and the second threshold value, update the unfilled electronic form to include the first autofill recommendation with the first electronic form field.

9. The system of claim 1, wherein the one or more processors are further programmed to:
  update the first accuracy score based on the update to the first autofill recommendation and store the updated first accuracy score with the first autofill recommendation.

10. A method comprising:
  identifying, based on previously stored form information, an unfilled electronic form accessed by a user device, wherein the unfilled electronic form comprises a plurality of electronic form fields;
  predicting, using a machine learning algorithm, a geolocation of the user device based on one or more user parameters associated with the user device, wherein the machine learning algorithm is trained using training data comprising user parameters associated with a set of test user devices;
  predicting, using the machine learning algorithm, (i) a first autofill recommendation for a first electronic form field of the plurality of electronic form fields of the unfilled electronic form based on the geolocation and (ii) a first accuracy score associated with the first autofill recommendation;
  determining that the first accuracy score exceeds a first threshold value and is less than a second threshold value;
  providing a prompt comprising the first autofill recommendation for the first electronic form field to the user device;
  receiving an input to the prompt comprising an update to the first autofill recommendation;
  determining a second autofill recommendation for a second electronic form field of the plurality of electronic form fields of the unfilled electronic form based on the update to the first autofill recommendation;
  assigning a second accuracy score to the second autofill recommendation; and
  storing the update to the first autofill recommendation and the second autofill recommendation as updated autofill recommendations for the plurality of electronic form fields.

11. The method of claim 10, further comprising:
  determining an intent to purchase one or more items by monitoring user interactions of a user with a website accessed via the user device, wherein the unfilled electronic form is associated with the website.

12. The method of claim 11, wherein the intent to purchase the one or more items includes adding the one or more items to a shopping cart of the website.

13. The method of claim 10, further comprising:
  determining that an accuracy score associated with one or more other electronic form fields of the plurality of electronic form fields exceeds the first threshold value; and
  including the one or more other electronic form fields in a first list stored in a database.

14. The method of claim 13, further comprising:
  storing the unfilled electronic form including an autofill recommendation of the one or more other electronic form fields in the database.

15. The method of claim 10, wherein determining the geolocation of the user device further comprises:
  determining an Internet Protocol address of the user device; and
  identifying, based on the Internet Protocol address of the user device, a routing device through which interactions were routed by performing a reverse lookup of the Internet Protocol address of the user device.

16. One or more non-transitory, computer-readable media storing instructions that, when executed by one or more processors, cause operations comprising:
  identifying, based on previously stored form information, an unfilled electronic form accessed by a user device comprising a plurality of electronic form fields;
  predicting, using a machine learning algorithm, a geolocation of the user device based on one or more user parameters associated with the user device, wherein the machine learning algorithm is trained using training data comprising user parameters associated with a set of test user devices;
  predicting, using the machine learning algorithm, (i) a first autofill recommendation for a first electronic form field of the plurality of electronic form fields of the unfilled electronic form based on the geolocation and (ii) a first accuracy score associated with the first autofill recommendation;
  in response to determining that the first accuracy score exceeds a first threshold value and is less than a second threshold value, providing a prompt comprising the first autofill recommendation to the user device;
  receiving an input to the prompt comprising an update to the first autofill recommendation;
  using the machine learning algorithm:
    determining a second autofill recommendation for a second electronic form field of the plurality of electronic form fields of the unfilled electronic form based on the update to the first autofill recommendation, and
    assigning a second accuracy score to the second autofill recommendation; and
  storing the update to the first autofill recommendation and the second autofill recommendation as updated autofill recommendations for of the plurality of electronic form fields.

17. The one or more non-transitory, computer-readable media of claim 16, wherein the operations further comprise:
   determining an intent to purchase one or more items by monitoring user interactions of a user with a website accessed via the user device, wherein the unfilled electronic form is associated with the website.

18. The one or more non-transitory, computer-readable media of claim 17, wherein the intent to purchase the one or more items includes adding the one or more items to a shopping cart of the website.

19. The one or more non-transitory, computer-readable media of claim 16, wherein the operations further comprise:
   in response to determining that an accuracy score associated with one or more other electronic form fields of the plurality of electronic form fields of the unfilled electronic form exceeds the first threshold value, including the one or more other electronic form fields in a first list stored in a database.

20. The one or more non-transitory, computer-readable media of claim 19, wherein the operations further comprise:
   storing the unfilled electronic form including an autofill recommendation of the one or more other electronic form fields in the database.

\* \* \* \* \*